United States Patent [19]

Ishida et al.

[11] 4,430,975

[45] Feb. 14, 1984

[54] THROTTLE VALVE ACTUATING SYSTEM USED IN IGNITION TYPE INTERNAL COMBUSTION ENGINES

[75] Inventors: Takashi Ishida, Ooi; Noboru Tominari, Tokyo, both of Japan

[73] Assignee: Mikuni Kogyo Kabushiki Kaisha, Tokyo, Japan

[21] Appl. No.: 384,523

[22] Filed: Jun. 3, 1982

[30] Foreign Application Priority Data

Jun. 12, 1981 [JP] Japan .................................. 56-89509

[51] Int. Cl.³ .............................................. F02D 9/02
[52] U.S. Cl. .................................... 123/399; 123/401; 123/478
[58] Field of Search ............... 123/478, 350, 389, 399, 123/401, 360, 361

[56] References Cited

U.S. PATENT DOCUMENTS

| 4,047,507 | 9/1977 | Noguchi et al. | 123/478 |
| 4,168,679 | 9/1979 | Ikeura et al. | 123/399 |
| 4,200,068 | 4/1980 | Sakakibara | 123/478 |
| 4,335,694 | 6/1982 | Mausner et al. | 123/478 |

Primary Examiner—Andrew M. Dolinar
Attorney, Agent, or Firm—Owen, Wickersham & Erickson

[57] ABSTRACT

A throttle valve actuating system in an electronic control fuel injection system for a spark ignition internal combustion engine which controls air flow rate as a function of fuel flow rate, wherein a throttle valve is made to be able to be opened and closed by a throttle actuator and pneumatic actuator in order to reduce the electric power consumption and to avoid the actuation delay with the variations of the operating conditions and environmental conditions. The throttle valve is operated by such a separate actuating power source as a step motor or the like without directly connecting the throttle valve to an accelerator pedal.

5 Claims, 2 Drawing Figures

THROTTLE VALVE ACTUATING SYSTEM USED IN IGNITION TYPE INTERNAL COMBUSTION ENGINES

BACKGROUND OF THE INVENTION (a) Field of the Invention

This invention relates to an electronic control fuel injection system for a spark ignition internal combustion engine wherein fuel flow rate is determined by a depression amount of an accelerator pedal to thereby determine air flow rate and, more particularly, to a throttle valve actuating system in ignition type internal combustion engines provided with a computer which puts in output signals from various sensors detecting a selected fuel injection amount, engine operating state and environmental conditions and operates an air amount to be supplied adapted to the operating state of the engine at such time point and a throttle servo-mechanism including a throttle actuator which can determine a proper opening degree of a throttle valve from the results of the operation of this computer.

(b) Description of the Prior Art

Recently the spark ignition internal combustion engine of the above mentioned type has come to be highlighted as being provided with a new electronic control type fuel injection system. This shall be summarized with reference to FIGS. 1 and 2 in which the reference numeral 1 denotes an accelerator pedal, 2 denotes, for example, a potentiometer for converting the displacement of the accelerator pedal 1 to an electric signal, 3 denotes a fuel supply means, 4 denotes a metering means for metering the fuel supplied from the fuel supply means 3, 5 denotes an injector connected to the metering means 4 and fitted within an intake manifold bore 6, 7 denotes a throttle valve, 8 denotes a throttle actuator consisting of a miniature servo-motor connected to a throttle shaft 7a, for example, through a pulley-and-belt mechanism to determine the opening degree of the throttle valve 7, 9 denotes a potentiometer or encoder for converting the actuation amount of the throttle actuator 8, that is, the opening degree of the throttle valve 7 to an electric signal and 10 denotes a computer which includes a microprocesser, specific purpose input/output interface and memory, puts in output signals from the potentiometers 2 and 9, metering means 4, throttle actuator 8 and such various sensors detecting the engine operating state and environmental conditions as a suction air temperature sensor, fuel supply line pressure sensor, engine temperature sensor and throttle valve downstream pressure sensor, puts out command signals to the metering means 4 to secure a fuel injection amount selected by the displacement of the accelerator pedal 1 and concentrically controls the throttle valve opening degree and number of idling revolutions responding to the fuel injection amount to the optimum valves in conformity with the operating state of the engine so that, when the operator depresses the accelerator pedal 1, a signal put out of the potentiometer 2 in response to the depression amount of the accelerator pedal 1 will be put into the computer 10 and the computer 10 will operate a pulse width and/or frequency of the injector 5 by the operating state of the engine at that time, will determine the fuel delivery amount from the injector 5, will inject it into the intake manifold 6, will mix it with intake air and will feed the mixture into the combustion chamber of the engine. The computer 10 will put in information from the above mentioned various sensors in the form of a voltage, electric current, degital signal and/or frequency signal, will operate functional relations between them and the flow rate of intake air, will operate the optimum air amount at that time point, will put out the results in the form of electric signals to the throttle actuator 8 and will actuate them to bring the throttle value 7 to a required opening degree position. Meanwhile, the pressure difference between the upstream side and downstream side of the throttle value 7 will be always detected and, by this signal and a simultaneously detected throttle valve position signal, the computer 10 will always continue to operate the optimum value every moment and will put out commands to the throttle actuator 8. Further, the inflow air amount determined by the combination of the pressure difference between the upstream side and downstream side of the throttle valve and the throttle valve opening degree will be calibrated in advance and the functional relations will be memorized as mappings in the memory of the computer so that the signal from the above mentioned pressure difference sensor, the output to the throttle actuator 8 or the electric signal from the potentiometer or encoder connected to the throttle actuator 8 will be always compared with these memories and operated.

In the internal combustion engine of this kind of conventional type, as described above, the throttle valve 7 is indirectly opened and closed so as to always maintain the optimum opening degree by the output from the computer 10 but there have been defects that, in case the throttle actuator 8 consists of a miniature servo-motor or step motor and the throttle shaft 7a and motor shaft are connected with each other through such power transmitting means as a belt, gear or cam mechanism, not only the electric power consumption will increase but also the response delay will not be able to be avoided.

SUMMARY OF THE INVENTION

A primary object of the present invention is to provide a throttle valve actuating system of the above mentioned type in internal combustion engines wherein the electric power consumption by the throttle actuator may be small and there is no response delay.

According to the present invention, this object is attained by a formation wherein a throttle valve is made to be opened and closed by a throttle actuator and a pneumatic actuator and the pneumatic actuator is actuated by a manifold vacuum of an engine through an electromagnetic valve controlled to be opened and closed by an output signal from a computer.

The pneumatic type actuator will be able to actuate adequately the throttle valve in a normal operation condition of the engine but will be not able to actuate adquately the throttle valve in response to various operation conditions of the engine at the time of engine start, disappearance of the vacuum or the like. This defect of the pneumatic type actuator may be removed by using the throttle actuator along with the pneumatic actuator.

Another object of the present invention is to provide a throttle valve actuating system of the above mentioned type wherein a throttle actuator is formed to be small and, even in case the actuating motor fails, the throttle valve will be able to be positively opened and closed.

According to a preferred formation of the present invention, the pneumatic actuator comprises a vacuum chamber communicating with the interior of an intake manifold bore below a throttle valve, a diaphragm chamber connected to this vacuum chamber through an electromagnetic valve, a diaphragm able to be displaced by the variation of a pressure acting on the diaphragm chamber and a link mechanism connected between the diaphragm and throttle valve.

The vacuum chamber is made to communicate with the intake manifold bore through an umbrella valve acting as a non-return valve and is larger in the capacity than the diaphragm chamber so that the vacuum chamber can be always kept in a high vacuum state and, when the vacuum chamber and diaphragm chamber are made to communicate with each other by the actuation of the electromagnetic valve, the diaphragm will be able to be quickly and properly displaced.

The electromagnetic valve is formed as a three-way electromagnetic valve so as to be able to be switched over to a first state wherein, as soon as the diaphragm chamber is made to communicate with the atmosphere, its communication with the vacuum chamber will be interrupted, a second state wherein, as soon as the diaphragm chamber is made to communicate with the vacuum chamber, its communication with the atmosphere will be interrupted and a third state wherein the communication among the vacuum chamber, diaphragm chamber and atmosphere is all interrupted so that the throttle valve can be properly operated at any required time point.

The throttle actuator comprises a motor connected to the computer, a first pulley secured to the main shaft of the motor, a second pulley secured to the throttle valve and a belt hung between the first pulley and second pulley.

The throttle actuator may comprise the motor and a gear train connected between the motor and throttle valve or the motor and a link mechanism connected between the motor and throttle valve.

These and other objects of the present invention will become more apparent during the course of the following detailed description and appended claims.

DESCRIPTION OF THE PREFERRED EMBODIMENT

Figure 1:
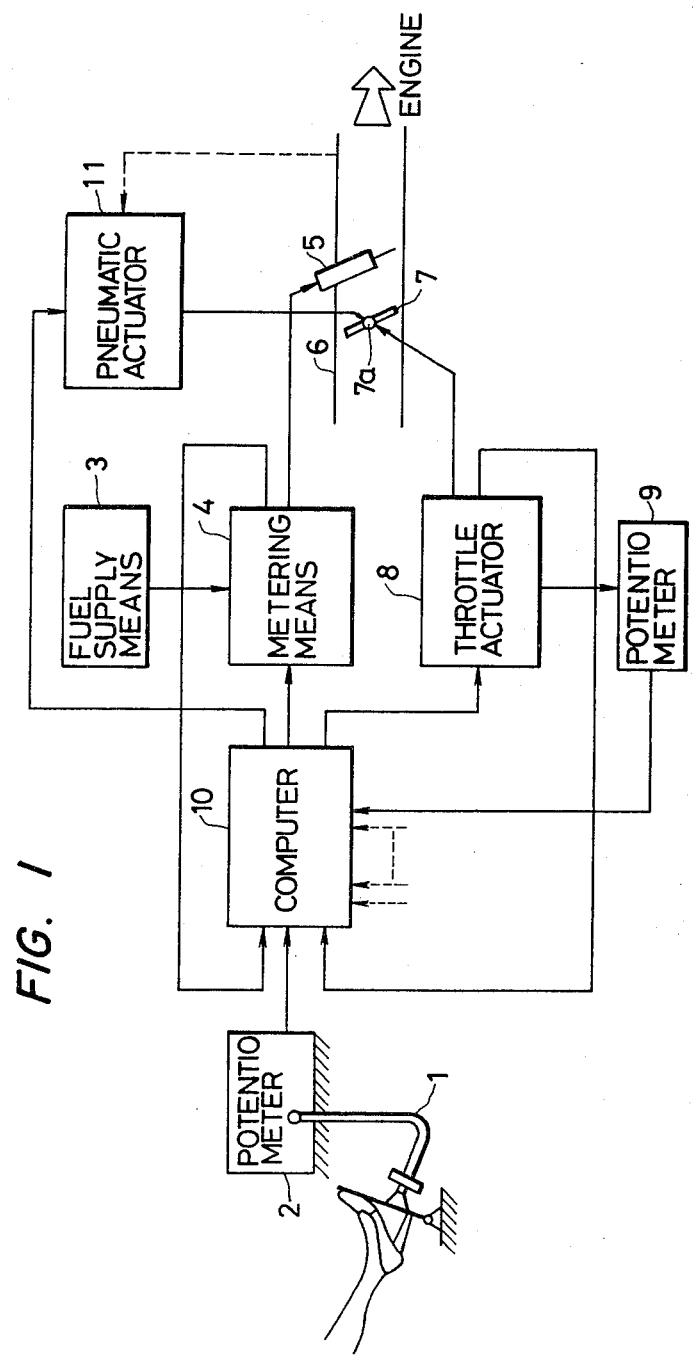
FIG. 1 is a block diagram showing an embodiment of a fuel priority type system provided with a throttle valve actuating system according to the present invention.
Figure 2:
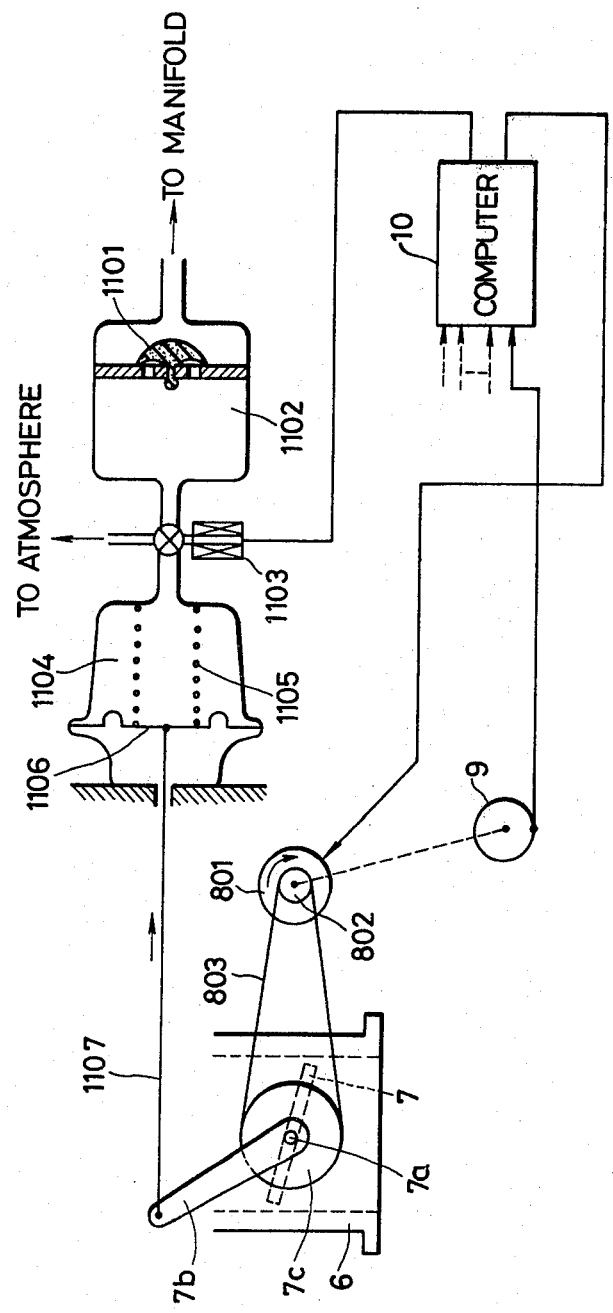
FIG. 2 is an explanatory view showing an embodiment of a throttle valve actuating system according to the present invention.

With reference to FIGS. 1 and 2 again in the following, the reference numeral 11 designates a pneumatic actuator actuated by an output from the computer 10 and comprising a vacuum chamber 1102 made to communicate with the interior of the intake manifold bore 6 below the throttle valve, a diaphragm chamber 1104 connected to the vacuum chamber 1102 through a three-way electromagnetic valve 1103 controlled to be opened and closed by the output from the computer 10, a diaphragm spring 1105 and a diaphragm 1106. The diaphragm 1106 is connected to the throttle shaft 7a through a link 1107 and an arm 7b secured to the throttle shaft 7a and connected to the link 1107. By the way, in FIG. 2, the reference numeral 801 denotes a servomotor or step motor, 802 denotes a pulley secured to the main shaft of the motor 801 and 803 denotes a belt hung between the pulley 802 and a pulley 7c secured to the throttle shaft 7a. The throttle actuator 8 is formed of them. The capacity of the vacuum chamber 1102 is so selected as to be larger than of the diaphragm chamber 1104 so that the vacuum chamber 1102 can be always held in a high vacuum state by an umbrella valve 1101 acting as a non-return valve. Further, the three-way electromagnetic valve 1103 can be switched over to a first position in which, as soon as the diaphragm chamber 1104 is made to communicate with the atmosphere, its communication with the vacuum chamber 1102 will be interrupted, a second position in which, as soon as the diaphragm chamber 1104 is made to communicate with the vacuum chamber 1102, its communication with the atmosphere will be interrupted and a third position in which the communication among the vacuum chamber 1102, diaphragm chamber 1105 and atmosphere is all interrupted.

As the system of the present invention is formed as mentioned above, when an operation command signal of an operator is put into the computer 10 as described above, an operation will be made by the computer 10 together with various input signals based on the engine operation condition and environmental conditions at that time and the result will be put out as an opening and closing command to the motor 801. Simultaneously with it, a signal will be issued also to the electromagnetic valve 1103 which will be switched from the first position over to the second position so that the motor 801 will be rotated in the direction indicated by the arrow, on the other hand, the link 1107 will be pulled in the direction indicated by the arrow by the rightward displacement of the diaphragm 1106 and the throttle valve 7 will be opened to a proper position from the illustrated position by the two actuating forces of the motor 801 and diaphragm 1106. In this case, as already described, as the position detecting potentiometer or encoder 9 will be always feeding the opening degree of the throttle valve 7 back to the computer 10, when the throttle valve 7 is in a proper opening degree position, a signal will be again issued from the computer 10, the electromagnetic valve 1103 will be switched from the second position over to the third position and, at the same time, the motor 801 will also stop. Thus the throttle valve 7 will be always quickly and properly held at a proper opening degree. The diaphragm 1106 will act as a pneumatic servo-mechanism helping the actuation of the motor 801.

The above mentioned embodiment is nothing but a mere embodiment. Various formations of the throttle actuator 8 and pneumatic actuator 11 are conceived. They all belong to the scope of the present invention.

As described above, according to the present invention, as the actuating force for opening and closing the throttle valve is obtained by the throttle actuator including the motor and the pneumatic actuator including the diaphragm actuated by the manifold vacuum, even a miniature motor low in the power consumption can be well used and the throttle valve opening degree can be always quickly and properly controlled. Further, there is an advantage that, in any case, the throttle valve can be positively opened and closed.

What is claimed is:

1. A throttle valve actuating system used in an electronic control fuel injection system for spark ignition internal combustion engines which controls air flow rate as a function of fuel flow rate, comprising metering means capable of selecting a fuel injection amount in response to a depression amount of an accelerator pedal; various sensors for respectively detecting a selected fuel injection amount, engine operating state and environmental conditions; a computer connected to said metering means and sensors and capable of operating an air amount to be supplied in conformity with the engine operating state by putting in output signals from said metering means and sensors; a throttle servo-mechanism connected to said computer and including a throttle actuator connected to a throttle valve to determine a proper opening degree of said throttle valve on the basis of the result of the operation of said computer; a pneumatic actuator connected to said throttle valve and capable of being actuated by a manifold vacuum to open and close said throttle valve; and an electromagnetic valve connected to said computer and capable of being controlled to be opened and closed by an output signal from said computer, said pneumatic actuator being actuated by said manifold vacuum through said electromagnetic valve.

2. A throttle valve actuating system according to claim 1 wherein said pneumatic actuator comprises a vacuum chamber connected to the interior of an intake manifold bore below said throttle valve, a diaphragm chamber connected to said vacuum chamber through said electromagnetic valve, a diaphragm forming a part of said diaphragm chamber and capable of being displaced by the variation of a pressure acting on said diaphragm chamber, and a link mechanism connected between said diaphragm and throttle valve.

3. A throttle valve actuating system according to claim 2 wherein said vacuum chamber is connected to said intake manifold bore through an unbrella valve provided in an inlet of said vacuum chamber and acting as a non-return valve and has a capacity larger than of said diaphragm chamber.

4. A throttle valve actuating system according to claim 2 or 3 wherein said electromagnetic valve is a three-way valve capable of being switched over to a first state wherein, as soon as said diaphragm chamber is opened in the atmosphere, the communication of said diaphragm chamber with said vacuum chamber is interrupted, a second state wherein, as soon as said diaphragm chamber is communicated with said vacuum chamber, the communication of said diaphragm chamber with the atmosphere is interrupted and a third state wherein said vacuum chamber, diaphragm chamber and atmosphere do not communicate with one another.

5. A throttle valve actuating system according to claim 1 wherein said throttle actuator comprises a motor connected to said computer, a first pulley secured to a rotor shaft of said motor, a second pulley secured to said throttle valve and a belt hung between said first pulley and second pulley.

* * * * *